US008480770B2

(12) United States Patent
Sumida et al.

(10) Patent No.: US 8,480,770 B2
(45) Date of Patent: Jul. 9, 2013

(54) HYDROGEN PRODUCTION SYSTEM AND METHOD OF CONTROLLING FLOW RATE OF OFFGAS IN THE SYSTEM

(71) Applicant: Sumitomo Seika Chemicals Co., Ltd., Hyogo (JP)

(72) Inventors: Toshihiko Sumida, Hyogo (JP);
Masanori Miyake, Hyogo (JP);
Hidenori Minami, Hyogo (JP);
Yoshinori Ueda, Hyogo (JP)

(73) Assignee: Sumitomo Seika Chemicals Co., Ltd., Hyogo (JP)

( * ) Notice: Subject to any disclaimer, the term of this patent is extended or adjusted under 35 U.S.C. 154(b) by 0 days.

(21) Appl. No.: 13/647,610

(22) Filed: Oct. 9, 2012

(65) Prior Publication Data

US 2013/0139684 A1    Jun. 6, 2013

Related U.S. Application Data

(62) Division of application No. 12/300,362, filed as application No. PCT/JP2007/059464 on May 7, 2007, now Pat. No. 8,298,305.

(30) Foreign Application Priority Data

May 11, 2006    (JP) ................................. 2006-132720

(51) Int. Cl.
*C10J 3/46* (2006.01)
*B01J 7/00* (2006.01)

(52) U.S. Cl.
USPC ................ 48/197 R; 48/61; 48/76; 48/127.9; 48/127.1; 48/191; 48/199 R; 423/652; 95/100; 95/103; 95/99; 95/141; 95/148; 422/110; 422/108; 422/600

(58) Field of Classification Search
USPC ........ 48/197 R, 61, 76, 191, 199 R; 423/652; 95/100, 103, 99, 141, 148
See application file for complete search history.

(56) References Cited

U.S. PATENT DOCUMENTS

| | | |
|---|---|---|
| 7,326,276 B2 | 2/2008 | Sumi et al. |
| 7,416,569 B2 | 8/2008 | Sumi et al. |
| 2006/0236860 A1 | 10/2006 | Sumida et al. |
| 2007/0237691 A1 | 10/2007 | Takata et al. |

FOREIGN PATENT DOCUMENTS

| | | |
|---|---|---|
| EP | 1 787 951 | 5/2007 |
| JP | 2001-10806 | 1/2001 |
| JP | 2002-355521 | 12/2002 |
| JP | 2002-355522 | 12/2002 |
| JP | 2004-75485 | 3/2004 |
| JP | 2004-292293 | 10/2004 |
| WO | WO 2004/076030 | 9/2004 |
| WO | WO 2006/006479 | 1/2006 |

*Primary Examiner* — Kaity V. Handal
(74) *Attorney, Agent, or Firm* — Hamre, Schumann, Mueller & Larson, P.C.

(57) ABSTRACT

A hydrogen manufacturing system for performing offgas flow control includes: a vaporizer (1) for heating a material mixture containing a hydrocarbon material; a reforming reactor (2) for generating hydrogen-containing reformed gas by reforming reactions of the material; a PSA separator (5) for repeating a cycle of adsorption and desorption, where in the adsorption PSA separation is performed with an adsorption tower loaded with an adsorbent to adsorb unnecessary components in the reformed gas and extract hydrogen-enriched gas out of the tower, and in the desorption the offgas containing the unnecessary components from the adsorbent and remaining hydrogen is discharged from the tower; and a buffer tank (6) for holding the offgas before supplying to the vaporizer. The offgas flow supply from the tank (6) to the vaporizer is changed continuously over time when the cycle time is changed according to load change on the separator (5).

4 Claims, 5 Drawing Sheets

HYDROGEN PRODUCTION SYSTEM AND METHOD OF CONTROLLING FLOW RATE OF OFFGAS IN THE SYSTEM

This application is a divisional of U.S. application Ser. No. 12/300,362, filed Nov. 11, 2008, issued as U.S. Pat. No. 8,298,305, which is a U.S. National Stage of PCT/JP2007/059464, filed May 7, 2007, which applications are incorporated herein by reference.

TECHNICAL FIELD

The present invention relates to a hydrogen manufacturing system for industrially manufacturing hydrogen from a hydrocarbon raw material. Further, the present invention relates to an offgas flow controlling method for the hydrogen manufacturing system.

BACKGROUND ART

Hydrogen (high-purity hydrogen) is used in a number of industrial fields such as metal heat treatment, glass melting, semiconductor manufacturing and optical fiber manufacturing. Hydrogen is also used as fuel for fuel cells.

A hydrogen manufacturing system for industrially manufacturing hydrogen is disclosed in the following Patent Document 1 for example. The hydrogen manufacturing system disclosed in Patent Document 1 includes a vaporizer, a reforming reactor and a pressure swing adsorption gas separator. The vaporizer heats and vaporizes a raw material mixture, which contains a hydrocarbon raw material such as methanol and natural gas, water and oxygen, before it is supplied to the reforming reactor. In the vaporizer, the raw material mixture is flown through the vaporizer while being heated to a predetermined temperature using heat from a high-temperature combustion gas resulted from burning fuel. The vaporized raw material mixture undergoes reforming reactions in the reforming reactor to yield a reformed gas (which contains hydrogen). In the reforming reactor, reforming catalysts promote concomitant reactions; a steam-reforming reaction (in which hydrogen is generated as a primary product from the hydrocarbon raw material and water), which is an endothermal reaction, and a partial oxidization reforming reaction (in which hydrogen is generated as a primary product from hydrocarbon raw material and oxygen), which is an exothermic reaction. By adjusting a raw material mixture component ratio thereby balancing the amount of heat absorption by the steam-reforming reaction and the amount of heat generation by the partial oxidization reforming reaction, an autothermal reforming reaction is maintained and the reaction temperature in the reforming reactor stays substantially constant.

Patent Document 1: WO2006/006479

The pressure swing adsorption gas separator adsorbs and thereby removes unnecessary components other than hydrogen contained in the reformed gas, producing hydrogen-enriched gas as a final product. The separator has an adsorption tower loaded with an adsorbent for prioritized adsorption of those unnecessary components in the reformed gas. In the pressure swing adsorption gas separator, a pressure swing adsorption gas separation method (PSA separation method) is performed for gas separation. In the PSA separation method, gas separation is achieved by repeating a cycle in the adsorption tower which includes e.g. an adsorption process, a desorption process and a regeneration process. In the adsorption process the reformed gas is introduced in the adsorption tower to allow unnecessary components in the reformed gas to be adsorbed under pressurized conditions, and then to allow resulting hydrogen-enriched gas to flow out of the adsorption tower. In the desorption process, the pressure in the adsorption tower is reduced to allow the adsorbent to desorb the unnecessary components and then a gas (offgas) which contains residual hydrogen and the unnecessary components is discharged from the adsorption tower. In the regeneration process a cleaning gas, for example, is passed through the adsorption tower whereby adsorbing capability of the adsorbent to adsorb unnecessary components is restored. Generally, the length of time for performing one cycle (cycle time) is constant in normal operation where the reforming reactor and the pressure swing adsorption gas separator are under a constant load.

The offgas discharged from the adsorption tower is supplied to the vaporizer via piping, where hydrogen gas contained in the offgas is consumed as a fuel for vaporizing the raw material mixture. Due to a characteristic of the PSA separation method, the amount and the gas concentration of the offgas discharged from the adsorption tower vary significantly over time. In the case where unnecessary components other than hydrogen are adsorbed and removed in the adsorption tower as described above, the amount (flow) of offgas discharged from the adsorption tower is relatively large and the hydrogen concentration in the offgas is relatively high in an early part of the desorption process. However, as time passes in the desorption process, the amount of offgas discharged from the adsorption tower decreases and the hydrogen concentration in the offgas also decreases. Further, in the PSA separation method, it is sometimes impossible to discharge the offgas continuously due to adsorption tower operation cycle limitations. Therefore, if the offgas from the adsorption tower is continuously supplied via the piping at an uncontrolled pace, the amount of hydrogen gas in the offgas supplied to the vaporizer changes relatively widely over time, resulting in unstable combustion in the vaporizer.

Thus, in order to reduce such a fluctuation in the amount of offgas supply or hydrogen gas supply to the vaporizer and to stabilize the stat of combustion in the vaporizer, a buffer tank of a relatively large capacity is sometimes provided in the piping which connects the pressure swing adsorption gas separator with the vaproizer. In this case of providing a buffer tank, offgas discharged from the adsorption tower is first introduced into the buffer tank. In the buffer tank, hydrogen concentration of the offgas is averaged, so that the supply flow of offgas from the buffer tank has a generally constant hydrogen concentration. In order to control the flow of offgas supplied to the vaporizer, a flow control valve is provided on the downstream side of the buffer tank.

In a hydrogen manufacturing system such as described as above, the vaporizer and the reforming reactor are supplied with a constant amount of raw material mixture (the amount of supply per unit time) in normal operation where the reforming reactor and the pressure swing adsorption gas separator are under a constant load. Meanwhile, as to the control over the offgas supply to the vaporizer, the flow control valve is set to a predetermined fixed degree of opening so that an average flow of offgas coming into the buffer tank and the amount of offgas flowing out of the buffer tank are generally equal to each other. Consequently in the vaporizer, a generally constant flow of the vaporization fuel is supplied by the offgas and a stable state of combustion is maintained. Also, in the reforming reactor, the temperature inside the reforming reactor is adjusted to a predetermined level by adjusting the ratio between the steam-reforming reaction and the partial oxidization reforming reaction which are proceeding in the reforming reactor, as described earlier. Thus, under a normal operation, the above-described hydrogen manufacturing system continues to heat and vaporize the raw material mixture as well as maintains a predetermined temperature inside the reforming reactor, using only the self-supplied heat which is generated in association with the system operation.

Now, in normal operation of the above-described hydrogen manufacturing system, if a change is to be made on the amount of production of the hydrogen-enriched gas as a final product gas, the load on the reforming reactor and the load on the pressure swing adsorption gas separator need to be changed. For example, when the amount of production of the hydrogen-enriched gas is to be increased, it is necessary to gradually increase the load on the reforming reactor and the load on the pressure swing adsorption gas separator until a state of normal operation as after the load change has been reached, so the amount of raw material mixture supply to the vaporizer and to the reforming reactor is increased continuously. Since this causes continuous increase in the amount (flow) of reformed gas generated in the reforming reactor and then supplied to the pressure swing adsorption gas separator, operating conditions for the pressure swing adsorption gas separator needs to be changed. As described above, the pressure swing adsorption gas separator is designed to repeat a cycle which includes the adsorption process, the desorption process and the regeneration process. Under this design, each process in a cycle is executed in accordance with a predetermined time chart, and this cycle is executed in a predetermined cycle time. In a cycle subsequent to a load change, the flow of reformed gas supplied to the pressure swing adsorption gas separator increases; however, the ability (capacity) of the adsorption tower to hold unnecessary components on the adsorbent is substantially constant and therefore it is necessary to shorten the cycle time correspondingly to the amount of increase in the flow of reformed gas. By repeating this, the cycle time in the pressure wing adsorption gas separator is successively shortened in each cycle until a state of normal operation as after the load change has been reached.

In the case that the load is increased, a conventional control on offgas supply to the vaporizer accompanies step-wise increase in the flow of offgas to the vaporizer in synchronization with the operation cycle of the pressure swing adsorption gas separator. Specifically, in synchronization with cycle switching in the pressure swing adsorption gas separator, the degree of opening of the flow control valve on the downstream side of the buffer tank is increase in a step-wise manner so that the amount of offgas which flows into the buffer tank during the cycle (i.e., an average flow of offgas into the buffer tank in this particular cycle) will be equal to the amount of offgas which flows out of the buffer tank during the cycle (i.e., the flow of offgas moving out of the buffer tank in this particular cycle). Such a control as the above enables to keep a material balance between the amount of offgas which flows into the buffer tank and the amount of offgas which flows out of the buffer tank when the amount of production of the final product gas (hydrogen-enriched gas) is increased, so there is no such trouble as extreme pressure drop or surge in the buffer tank.

However, under such a control, with regard to the amount of raw material mixture supply to the vaporizer and the flow of offgas, while the amount of raw material mixture supply is increased continuously, the offgas flow is increased in a stepped manner (i.e. discontinuously). Such a step-wise change in the offgas flow causes a step-wise change in the state of combustion in the vaporizer, and as a result, there is a possibility that the amount of vaporized raw material mixture will increase discontinuously. This poses a risk that the reforming reaction will not proceed smoothly in the reforming reactor and the overall operation of the hydrogen manufacturing system will be affected. In other words, there is a risk that the hydrogen manufacturing system will not operate smoothly when increasing the amount of production of the final product gas. Such a problem can also occur when decreasing the amount of production of the final product gas, and also occur when starting or stopping the operation of the hydrogen manufacturing system.

DISCLOSURE OF THE INVENTION

The present invention has been proposed under the above-described circumstances, for a hydrogen manufacturing system in which a vaporizer uses offgas as a fuel for heating the mixed material before supplied to the reformer, where the offgas was discharged from a pressure swing adsorption gas separator in the process of making hydrogen-enriched gas by refining a reformed gas, and it is an object of the present invention to provide an offgas flow controlling method for avoiding convulsive change in the supply flow of offgas to the vaporizer when changing the load on the pressure swing adsorption gas separator.

Another object of the present invention is to provide a hydrogen manufacturing system controlled by the offgas flow controlling method.

According to a first aspect of the present invention, there in provided an offgas flow controlling method for a hydrogen manufacturing system which includes: a vaporizer for heating and vaporizing a raw material mixture containing a hydrocarbon raw material; a reforming reactor for generating a reformed gas from the vaporized raw material mixture by reforming reactions of the hydrocarbon raw material, the reformed gas containing hydrogen; a pressure swing adsorption gas separator with an adsorption tower loaded with an adsorbent for pressure swing adsorption gas separation, where the pressure swing adsorption gas separator causes a cycle of at least an adsorption process and a desorption process to be repeated in the adsorption tower, with the adsorption process including introducing the reformed gas into the adsorption tower for allowing unnecessary components in the reformed gas to be adsorbed by the adsorbent and then extracting hydrogen-enriched gas from the adsorption tower, and with the desorption process including desorbing the unnecessary components from the adsorbent and discharging offgas containing hydrogen remaining in the adsorption tower and the unnecessary components from the adsorption tower; an offgas supply pipe for supplying the offgas discharged from the adsorption tower to the vaporizer as a fuel for heating the raw material mixture; a buffer tank provided at the offgas supply pipe for temporarily accommodating the offgas discharged from the adsorption tower; and a flow control unit for controlling a flow of the offgas to be supplied via the buffer tank to the vaporizer. The offgas flow controlling method comprises the step of changing the flow of the offgas supplied from the buffer tank to the vaporizer continuously with time by the flow control unit at least in part of the changed cycle time in changing a cycle time from a preceding cycle to a following cycle in accordance with load change in the pressure swing adsorption gas separator.

In the above offgas flow controlling method, the flow of offgas supplied from the buffer tank to the vaporizer is changed continuously over time when the load on the PSA separator is changed. This makes it possible to reduce abrupt variations in the offgas flow supply to the vaporizer, as compared to when the offgas flow is changed in a stepwise manner. Therefore, the present flow control method makes it possible to reduce abrupt change in the combustion state in the vaporizer at a time of load change on the pressure swing adsorption gas separator, and as a result, to reduce influences on the hydrogen manufacturing system.

Preferably, the preceding cycle includes a sustain period in which the flow of the offgas from the buffer tank is maintained at a constant level and a following change period in which the flow of the offgas is changed in a linear manner; wherein the following cycle includes a preceding change period in which the flow of the offgas from the buffer tank is changed in a linear manner and a sustain period in which the flow of the offgas is maintained at a constant level; wherein a length of the following change period in the preceding cycle is equal to a length of the preceding change period of the following cycle; and a change rate in the flow of the offgas from the buffer tank is constant throughout these two change periods: wherein the flow of the offgas from the buffer tank at an end of the preceding change period in the following cycle is equal to an average flow of the offgas discharged from the adsorption tower in the following cycle.

According to such a flow control method, the amount of offgas which is discharged from the adsorption tower and is supplied to the buffer tank side becomes equal to the amount of offgas which is supplied from the buffer tank to the vaporizer side, in the following change period and the preceding change period in which the offgas flow from the butter tank changes continuously over time. Hence, it is possible to avoid abrupt variations in the offgas flow supply from the buffer tank to the vaporizer while keeping a material balance in the amount of offgas inflow to the buffer tank and offgas outflow from the buffer tank before and after the load change in the PSA separator.

According to an embodiment of the present invention, the length of the following change period in the preceding cycle is a half of the cycle time of the following cycle in a case where the cycle time of the following cycle is decreased as compared to the cycle time of the preceding cycle.

According to another embodiment of the present invention, the length of the preceding change period in the following cycle is a half of the cycle time of the preceding cycle in a case where the cycle time of the following cycle is increased as compared to the cycle time of the preceding cycle.

According to a second aspect of the present invention, there is provided an offgas flow controlling method for a system including: a pressure swing adsorption gas separator for a pressure swing adsorption gas separation method, the pressure swing adsorption gas separator being designed to repeat cycle including an adsorption process and a desorption process, the adsorption process being performed for extracting first component gas which is adsorption resistant as target gas from raw material gas, the desorption process being performed for extracting offgas from the raw material gas, the raw material gas containing the first component gas and second component gas which is easily adsorbable, the offgas containing the second component gas and the first component gas; an offgas consumption unit for consuming the offgas; an offgas supply pipe for supplying the offgas extracted from the pressure swing adsorption gas separator to the offgas consumption unit; a buffer tank provided as the offgas supply pipe for temporarily accommodating the offgas extracted from the pressure swing adsorption gas separator; and a flow control unit for controlling a flow of the offgas supplied via the buffer tank to the offgas consumption unit. The method comprises the step of changing the flow of the offgass supplied form the buffer tank to the offgas consumption unit continuously with time by the flow control unit at least in part of the changed cycle time in changing a cycle time from a preceding cycle to a following cycle in accordance with load change in the pressure swing adsorption gas separator.

According to a third aspect of the present invention, there is provided a hydrogen manufacturing system which includes: a vaporizer for heating and vaporizing a raw material mixture containing hydrocarbon raw material; a reforming reactor for generating reformed gas from the vaporized raw material mixture by means of reforming reactions of the hydrocarbon raw material, the reformed gas containing hydrogen; a pressure swing adsorption gas separator with an adsorption tower loaded with an adsorbent for pressure swing adsorption gas separation, where the pressure swing adsorption gas separator causes a cycle of at least an adsorption process and a desorption process to be repeated in the adsorption tower, with the adsorption process including introducing the reformed gas into the adsorption tower for allowing unnecessary components in the reformed gas to be adsorbed by the adsorbent and then extracting hydrogen-enriched gas from the adsorption tower, and with the desorption process including desorbing the unnecessary components from the adsorbent and discharging offgas containing hydrogen remaining in the adsorption tower and the unnecessary components from the adsorption tower; an offgas supply pipe for supplying the offgas discharged from the adsorption tower to the vaporizer as a fuel for heating the raw material mixture; a buffer tank provided at the offgas supply pipe for temporary accommodating the offgas discharged from the adsorption tower; and a flow control unit for controlling a flow of the offgas to be supplied via the buffer tank to the vaporizer. The flow control unit continuously changes the flow of the offgas continuously with time in changing a cycle time from a preceding cycle to a following cycle in accordance with load change in the pressure swing adsorption gas separator, the flow of the offgas being supplied from the buffer tank to the vaporizer at least in part of the changed cycle time.

Other characteristics and advantages of the present invention will become clearer from the following detailed description to be made with reference to the attached drawings.

BEST MODE FOR CARRYING OUT THE INVENTION

Figure 1:
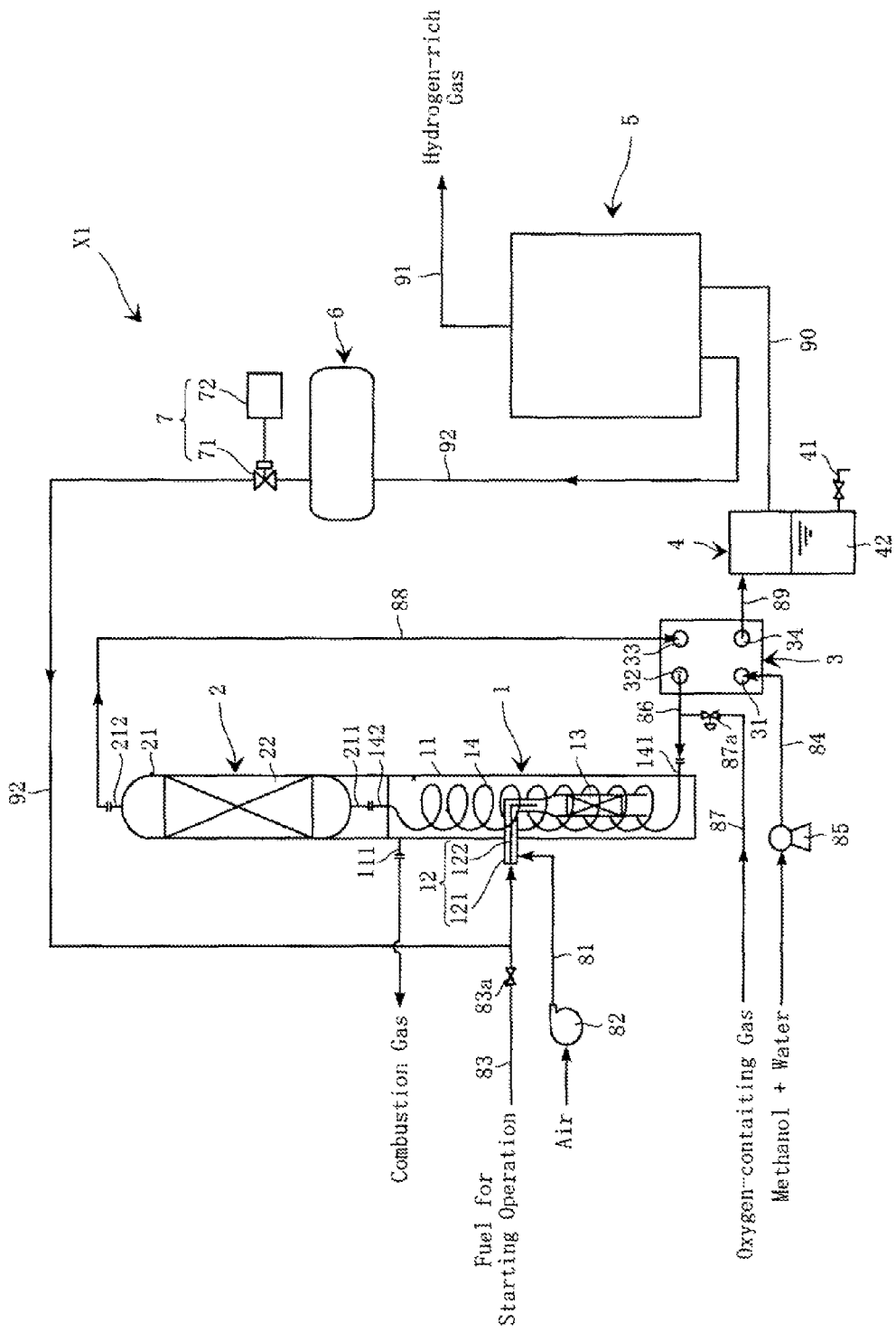
FIG. 1 is a schematic diagram of a hydrogen manufacturing system which can be used for performing an offgas flow controlling method according to the present invention.

FIG. 1 is a schematic diagram of a hydrogen manufacturing system X1 which can be used for performing an offgas flow controlling method according to the present invention. The hydrogen manufacturing system X1 includes a vaporizer 1, a reforming reactor 2, a heat exchanger 3, a gas-liquid separator 4, a pressure swing adsorption gas separator (PSA separator) 5, a buffer tank 6 and an offgas flow controlling unit 7, and is configured to manufacture hydrogen from methanol as a principal hydrocarbon raw material.

The vaporizer 1, which includes a main container 11, a supply pipe 12, a catalytic combustion section 13 and a distribution pipe 14, is a place where a material mixture which includes methanol, water and oxygen is heated into a vaporized state. FIG. 1 shows internal structure of the vaporizer 1 in a schematic manner.

The main container 11 has a structure as a closed tube, having an upper end provided with a combustion gas discharge port 111. The supply pipe 12 has a double-tube structure made of an outer pipe 121 and an inner pipe 122. The outer pipe 121 has an upper end which is connected with a pipe 81 outside of the main container 11; and a lower end which is open to inside the main container 11. The inner pipe 122 has an upper end which is connected with a pipe 83 and an offgas supply pipe 92 outside of the main container 11; and a lower end which is open to inside of the outer pipe 121. The pipe 81 which is connected with the outer pipe 121 is connected with an air blower 82. The pipe 83 which is connected with the inner pipe 122 is connected with a supply source (not illustrated) of a vaporization fuel (e.g. LPG: liquefied petroleum gas) used for starting operation. The pipe 83 is provided with an automatic valve 83a. The catalytic combustion section 13, which is provided at a lower end of the outer pipe 121, generates high-temperature combustion gas by catalytic combustion of the hydrogen and the above-described operation-starting fuel. The catalytic combustion section 13 is loaded with a combustion catalyst. Examples of the combustion catalyst include platinum-metal catalysts such as platinum and palladium. The distribution pipe 14 has a raw material entering end 141, and a raw material exiting end 142 as well as a spiral portion around the supply pipe 12. The raw material entering end 141 comes out of the main container 11 at the lower end of the main container 11. The raw material exiting end 142 comes out of the main container 11 at the upper end of the main container 11. When the vaporization fuel which is supplied via the inner pipe 122 is burned in the catalytic combustion section 13, the combustion gas is released from the open end (the lower end as in the Figure) of the outer pipe 121, flows around the distribution pipe 14 as it passes through the main container 11, and then discharged from the combustion gas discharge port 111 to the outside of the vaporizer 1. Heat storage material (not illustrated) is fitted around the supply pipe 12 and the distribution pipe 14 in the main container 11 as necessary.

As shown in FIG. 1, the reforming reactor 2 includes a main container 21 and a reforming reaction section 22. The reforming reactor 2 is where a steam-reforming reaction and a partial oxidization reforming reaction of methanol take place concurrently thereby reforming the methanol raw material mixture, which was made into the gaseous form in the vaporizer 1, into a hydrogen-containing reformed gas.

The main container 21 has a structure as a closed tube, having a lower end provided with a raw material entering port 211, and an upper end provided with a reformed gas exit port 212. The raw material entering port 211 is connected with the raw material exiting end 142 of the vaporizer 1. The reforming reaction section 22 is provided inside the main container 21, and is loaded with a reforming catalyst (not illustrated). The reforming catalyst promotes the steam-reforming reaction and the partial oxidization reforming reaction of the methanol in the vaporized raw material mixture. An example of the reforming catalyst is a mixture containing aluminum oxide, copper oxide and zinc oxide. The reforming catalyst contains these components at a ratio of 42 wt % for CuO, 47 wt % ZnO and 10 wt % for $Al_2O_3$ for example.

The heat exchanger 3, which includes a methanol-water entrance port 31, a methanol-water exit port 32, a reformed-gas entrance port 33 and the reformed-gas exit port 34, is where heat exchange takes place between methanol-water before being supplied to the vaporizer 1 and the reformed gas generated in the reforming reactor 2, whereby the methanol-water is preheated and the reformed gas is cooled. Inside the heat exchanger 3 are a channel for the methanol-water to flow from the methanol-water entrance port 31 to the methanol-water exit port 32, and a channel for the reformed gas to flow from the reformed-gas entrance port 33 to the reformed-gas exit port 34, and the heat exchange takes place between these two channels. The heat exchanger 3 reduces the amount of thermal energy required to heat and vaporize the raw material mixture in the vaporizer 1.

The methanol-water entrance port 31 is connected with a methanol-water supply source (not illustrated) via a pipe 84 and a pump 85. The pump 85 sends methanol-water at a predetermined pressure. The methanol-water exit port 32 is connected with the raw material entering end 141 of the vaporizer 1 via a pipe 86. The pipe 86 is connected with an end of the pipe 87. The pipe 87 has another end which is connected with a supply source (not illustrated) of an oxygen-containing gas (such as oxygen-enriched gas and air). The pipe 87 is provided with a flow control valve 87a for controlling oxygen-containing gas flow. The reformed-gas entrance port 33 is connected with the reformed gas exit port 212 of the reforming reactor 2 via a pipe 88. The reformed-gas exit port 34 is connected with the gas-liquid separator 4 via the pipe 89.

The gas-liquid separator 4, which includes a liquid discharge port 41, is where liquid components (such as water) 42 contained in the reformed gas is separated from the gas. The liquid discharge port 41 discharges the liquid components 42 collected in the gas-liquid separator 4 to the outside of the gas-liquid separator 4.

The PSA separator 5, which includes at least one adsorption tower loaded with an adsorbent, is where hydrogen-enriched gas is produced from the reformed gas in a pressure swing adsorption gas separation method (PSA separation method) performed by using the adsorption tower. The adsorbent loaded in the adsorption tower may be a zeolite adsorbent, a carbon adsorbent, or an alumina adsorbent for example, and preferably, a zeolite adsorbent is used. The adsorption tower may be loaded with only one adsorbent or with a plurality of adsorbents. In the gas separation by means of PSA separation method performed in the PSA separator 5, a cycle which includes an adsorption process, a desorption process and a regeneration process is repeated. In the adsorption process, inside of the adsorption tower is brought under a predetermined high-pressure, and the reformed gas is introduced into the adsorption tower, allowing unnecessary components in the reformed gas (carbon monoxide, carbon dioxide, nitrogen, etc.) to be adsorbed by the adsorbent, and hydrogen-enriched gas is taken out of the adsorption tower. In the desorption process, the pressure inside the adsorption tower is reduced, the unnecessary components are released from the adsorbent, and an offgas which contains hydrogen remaining in the adsorption tower and the unnecessary components is discharged to the outside. In the regeneration process, a cleaning gas, for example, is passed through the adsorption tower, whereby adsorbing capability of the adsorbent to adsorb unnecessary components is restored in preparation for the adsorption process in the next cycle. The PSA separator 5 as described may be provided by a conventional PSA hydrogen separator.

The buffer tank 6, which is provided in the offgas supply pipe 92 which connects the PSA separator 5 and the vaporizer 1, is where the offgas discharged from the adsorption tower of the PSA separator 5 is received in order to reduce changes in the offgas flow before the offgas is supplied to the vaporizer 1.

The offgas flow controlling unit 7, which includes a flow control valve 71 provided in the offgas supply pipe 92 on the downstream side of the buffer tank 6, and a controller 72 which controls operation of the flow control valve 71, controls the flow of offgas supplied from the buffer tank 6 to the vaporizer 1. In the offgas flow controlling unit 7, the controller 72 controls the degree of opening of the flow control valve 71 in accordance with the offgas flow (an average flow) which flows into the buffer tank 6.

Next, a specific operation of the hydrogen manufacturing system X1 which has the arrangement described above will be explained. When operating the hydrogen manufacturing system X1, the pump 85 is driven to introduce methanol-water of a predetermined concentration into the heat exchanger 3 via the pipe 84 and the methanol-water entrance port 31. Inside the heat exchanger 3, the methanol-water which is relatively low in the temperature (10 through 25° C. for example) is heated (preheated) up to e.g. 137° C. in the heat exchanging process with the reformed gas which is introduced into the heat exchanger 3 and has a relatively high temperature (230 through 270° C.). The methanol-water which is preheated in the heat exchanger 3 comes out of the heat exchanger 3 at the methanol-water exit port 32, and while passing through the pipe 86, the methanol-water is mixed with oxygen-containing gas (e.g. oxygen-enriched gas and air) which is introduced into the pipe 86 via the pipe 87. The amount of supply of the oxygen-containing gas can be adjusted with the flow control valve 87a.

The raw material mixture (containing methanol, water and oxygen) is introduced into the distribution pipe 14 of the vaporizer 1 from the raw material entering end 141. During normal operation, the amount of supply of the raw material mixture (the amount supply per unit time) to the vaporizer 1 is adjusted to be constant. While passing through the distribution pipe 14, the raw material mixture introduced into the distribution pipe 14 is heated by the combustion gas generated in the catalytic combustion section 13 and vaporized up to a reaction temperature (230 through 270° C. for example) required for the upcoming reforming reaction in the reforming reactor 2. The vaporized raw material mixture comes out of the raw material exiting end 142 of the distribution pipe 14 to the outside of the vaporizer 1, and then is supplied to the reforming reactor 2 via the raw material entering port 211.

The raw material mixture supplied to the reforming reactor 2 is then introduced into the reforming reaction section 22. In the reforming reaction section 22, the reforming catalyst promotes an endothermic reaction, which is a steam-reforming reaction, of methanol and an exothermic reaction, which is a partial oxidization reforming reaction, of methanol concomitantly and a reformed gas which contains hydrogen is generated from the raw material mixture. In the present embodiment, the ratio of methanol consumed in each reaction (in other words, the ratio of the steam-reforming reaction to the partial oxidization reforming reaction) is selected so that the reaction temperature in the reforming reaction section 22 will remain substantially the same (at 230 through 270° C. for example). Thus, an autothermal reforming reaction of methanol proceeds in the reforming reaction section 22.

The reformed gas generated in the reforming reaction section 22 comes out of the reformed gas exit port 212 to the outside of the reforming reactor 2, and then flows through the pipe 88 and the reformed-gas entrance port 33 into the heat exchanger 3. In the heat exchanger 3, the reformed gas which is relatively high in the temperature (230 through 270° C. for example) is cooled in the heat exchange process as described earlier, down to 40° C. for example, by methanol-water which is introduced into the heat exchanger 3 and has a relatively low temperature (10 through 25° C. for example). The reformed gas cooled in the heat exchanger 3 flows out of the reformed-gas exit port 34 to the outside of the heat exchanger 3, flows through the pipe 89 and then into the gas-liquid separator 4.

As the reformed gas is introduced into the gas-liquid separator 4, liquid components 42 contained in the reformed gas are separated from the reformed gas. This prevents the liquid components 42 from flowing into the adsorption tower of the PSA separator 5 located on the downstream side of the gas-liquid separator 4, and hence deterioration of the adsorbent caused by contact of the liquid components 42 with the adsorbent loaded in the adsorption tower is reduced. The liquid components 42 collected in this gas-liquid separation process are discharged via the liquid discharge port 41 from the gas-liquid separator 4 to the outside. On the other hand, the reformed gas which has passed through the gas-liquid separator 4 is supplied to the PSA separator 5 via a pipe 90. During the normal operation, the flow of reformed gas supplied via the reforming reactor 2 to the PSA separator 5 is substantially constant since the amount of raw material mixture supplied to the vaporizer 1 is constant.

In the PSA separator 5, a cycle which includes an adsorption process, a desorption process, and a regeneration process is repeated by the PSA separation method. In the adsorption process, the reformed gas which contains hydrogen is introduced into the adsorption tower under a predetermined high pressure state. In the adsorption tower, the adsorbent adsorbs and thereby removes unnecessary components (carbon monoxide, carbon dioxide, unreacted methanol, nitrogen, etc.) contained in the reformed gas, and hydrogen-enriched gas (a gas which has a high hydrogen concentration) is taken out of the tower as a product gas. The obtained hydrogen-enriched gas is taken out of the hydrogen manufacturing system X1 via the pipe 91. In the desorption process, the pressure in the adsorption tower is reduced, whereby the unnecessary components are desorbed from the adsorbent, and then an offgas which contains hydrogen which is remaining in the adsorption tower and the unnecessary components are discharged to the outside of the adsorption tower. In the regeneration process, a cleaning gas for example (which is generally provided by part of the hydrogen-enriched gas) is passed through the adsorption tower, whereby adsorbing capability of the adsorbent to adsorb unnecessary components is restored. Thus, the PSA separator 5 produces hydrogen-enriched gas (final product gas) as well as offgas. The hydrogen-enriched gas is continuously consumed for a predetermined purpose or stored in a predetermined tank, for example. The offgas flows through the offgas supply pipe 92 into the buffer tank 6 and is stored temporarily in the buffer tank 6.

In normal operation, the flow of reformed gas supplied to the adsorption tower of the PSA separator 5 is substantially constant, and therefore the amount of time (the cycle time) for the cycle which is performed repeatedly in the PSA separator 5 is constant. Examples of the cycle time in the PSA separator 5 and of the amount of offgas discharged from the PSA separator 5 are as follows: In normal operation where the load on the PSA separator 5 is 50%, the cycle time is 200 second, with an average flow of discharged offgas being 7.1 Nm³/h.

The offgas in the buffer tank 6 undergoes flow adjustment by the flow control valve 71 and then is supplied to the vaporizer 1, as a vaporization fuel via the offgas supply pipe 92. In normal operation, an adjustment is made to the degree of opening of the flow control valve 71 so that an average flow of the offgas discharged from the PSA separator 5 is equal to the flow of offgas discharged from the buffer tank 6. In the case that the average flow of the offgas discharged from the PSA separator 5 is 7.1 Nm³/h as described above, the setting on the degree of opening of the flow control valve 71 is fixed so that the offgas flow which passes through the flow control valve 71 is 7.1 Nm³/h. With this arrangement, it is possible to achieve a material balance between the amount of offgas which flows into the buffer tank 6 and the amount of offgas which flows out of the buffer tank 6.

The offgas which was supplied to the vaporizer 1 as the vaporization fuel flows through the inner pipe 122 and the outer pipe 121, and is introduced into the catalytic combustion section 13. Meanwhile, the catalytic combustion section 13 is continued to be supplied with air via the pipe 81 and the outer pipe 121. In the catalytic combustion section 13, the combustion catalyst promotes catalytic combustion of hydrogen in the offgas, yielding combustion gas of a high temperature (500 through 600° C. for example). The high-temperature combustion gas generated in the catalytic combustion section 13 is released from the open end (lower end as in the figure) of the outer pipe 121 of the supply pipe 12, passes around the distribution pipe 14 in the main container 11, and then discharged from the combustion gas discharge port 111 to the outside of the vaporizer 1. When the combustion gas passes around the distribution pipe 14, the combustion gas which serves as a heat source gives thermal energy to the distribution pipe 14, whereby the raw material mixture which is passing through the distribution pipe 14 is heated to a predetermined temperature (230 through 270° C. for example) and become vaporized. Since the distribution pipe 14 has a spiral portion, it is possible to secure a large surface area (heat receiving area) of the distribution pipe 14. Therefore, the distribution pipe 14 which has such a spiral portion as the above enables to increase thermal conduction efficiency to the raw material mixture which is passing through the distribution pipe 14, and thereby to efficiently heat the raw material mixture. Also, since the catalytic combustion leaves very little incomplete combustion gas, releasing the combustion gas eventually into the atmosphere will cause only a minimal amount of environmental load.

As has been described, according to the hydrogen manufacturing system X1, raw material passes through the heat exchanger 3, the vaporizer 1, the reforming reactor 2, the heat exchanger 3, the gas-liquid separator 4 and the PSA separator 5 sequentially in normal operation, whereby hydrogen-enriched gas is produced from the PSA separator 5 and offgas is discharged from the PSA separator 5, sent to the buffer tank 6 and then supplied to the vaporizer 1.

According to the hydrogen manufacturing system X1, the flow of offgas which is discharged from the PSA separator 5 and supplied to the vaporizer 1 is adjusted by the buffer tank 6 and the offgas flow controlling unit 7, whereby in normal operation, the offgas from the PSA separator 5 alone is sufficient as a supply of fuel which is necessary to heat the raw material mixture in the vaporizer 1 into a vaporized state of a predetermined temperature. Also, according to the hydrogen manufacturing system X1, inside of the reforming reactor 2 is maintained at a predetermined reaction temperature by an adjustment on the ratio between the concurrent steam-reforming reaction and partial oxidization reforming reaction of the hydrocarbon raw material occurring in the reforming reaction section 22 of the reforming reactor 2. As described, the hydrogen manufacturing system X1 keeps heating and thereby vaporizing the raw material mixture and maintains the reforming reaction section 22 of the reforming reactor 2 at a predetermined temperature in normal operation only with the self-supplied heat which is generated in association with the system operation.

The operation of the hydrogen manufacturing system X1 described above is a normal operation where a sufficient amount of offgas is supplied to the catalytic combustion section 13 in the vaporizer 1. However, when starting the operation for example, there is not a sufficient supply of offgas to the catalytic combustion section 13. In such a case for example, the automatic valve 83a is kept open until there is a sufficient supply of offgas to the catalytic combustion section 13, whereby a supplemental supply of vaporization fuel (LPG for example) required in the catalytic combustion section 13 is made to the vaporizer 1, i.e. to the catalytic combustion section 13.

Next, description will be made for an operation of the hydrogen manufacturing system X1 when the amount of production of hydrogen-enriched gas as a final product gas is changed from that of normal operation. When increasing the amount of production of the hydrogen-enriched gas for example, it is necessary to increase the load on the reforming reactor 2 and on the PSA gas separator 5. In this case, it is preferable that abrupt load changes on the reforming reactor 2 be avoided, and therefore, the amount of raw material mixture supplied to the vaporizer 1, i.e. to the reforming reactor 2, is increased continuously over time. As the amount of raw material mixture supply to the reforming reactor 2 increases continuously, the amount of reformed gas generated in the reforming reactor 2 also increases. As a result, the flow of reformed gas supplied to the PSA separator 5 also increases continuously, which requires changes in operational conditions of the PSA separator 5. As for the PSA separator 5, since the adsorbent in the adsorption tower has a substantially fixed capacity to hold unnecessary components, if the flow of reformed gas introduced into the adsorption tower is increasing continuously, the cycle time must be shortened accordingly to compensate for the increase in the reformed gas flow. As the cycle time is shortened accordingly, the amount (flow) of the offgas discharged from the PSA separator 5 increases.

Figure 2:
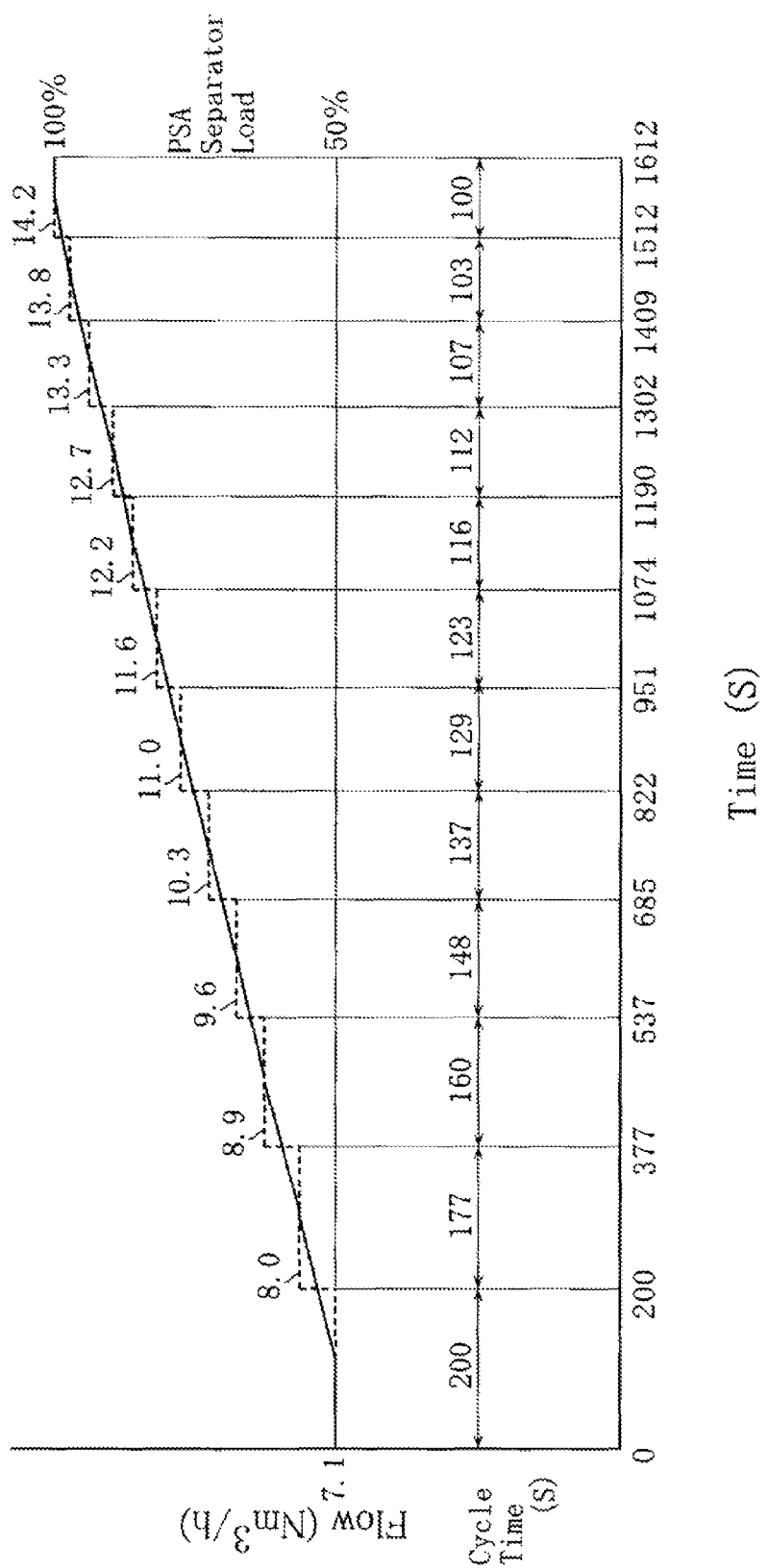
FIG. 2 is a graph for describing the offgas flow controlling method according to the present invention, showing an example of time-course changes in offgas supply flow from a buffer tank to a vaporizer in association with an increase in a load on a pressure swing adsorption gas separator.
Figure 3:
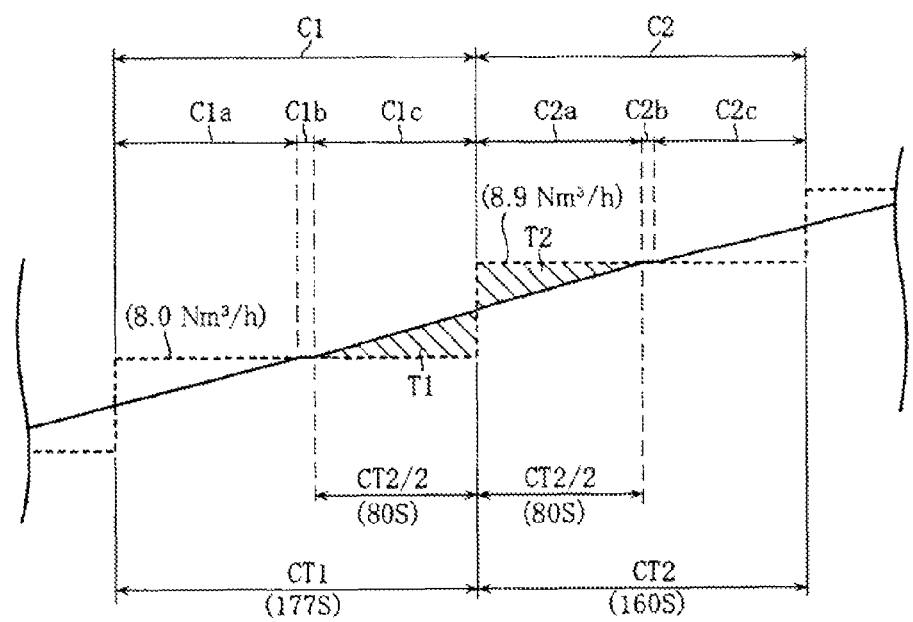
FIG. 3 is an enlarged portion of the graph shown in FIG. 2.

The control of the offgas which is supplied from the buffer tank 6 to the vaporizer 1 is performed so that the flow includes the portion increasing continuously over time. A graph in FIG. 2 shows an example of time-course changes in the offgas flow from the buffer tank 6 to the vaporizer 1 under such a control as the above. FIG. 2 shows changes in the flow during the period in which the load on the PSA separator 5 is changed from 50% to 100%. In the graph in FIG. 2, the horizontal axis represents the time passed during the load chance in the PSA separator 5 whereas the vertical axis (left side) represents the offgas flow. In the graph in FIG. 2, the broken lines represent an average flow of the offgas discharged from the adsorption tower in each cycle of the PSA separator 5 whereas the solid lines represent the offgas flow supplied from the buffer tank 6 to the vaporizer 1. It should be noted here that the broken lines in FIG. 2 (which indicate the above-mentioned average flow) correspond to changes in the offgas flow supplied from the buffer tank to the vaporizer in the conventional flow control method. FIG. 3 is an enlargement of a portion in FIG. 2, showing changes in the flow between two consecutive cycles C1, C2.

In FIG. 3, as a transition takes place from the cycle C1 to the cycle C2, the cycle time is reduced from CT1 to CT2 for the new cycle. As shown in the figure, a change in the offgas flow (solid lines) from the buffer tank 6 includes a change portion in the cycle C1 as well as a change portion in the cycle C2. Of these, the change portion in the cycle C1 is composed of a preceding change period C1a in which the flow is increased in a continuous and linear manner; a sustain period C1b in which the flow is held at a constant level; and a following change period C1c in which the flow is increased in a continuous and linear manner. Also, the change portion in the cycle C2 is composed of a preceding change period C2a in which the flow is increased in a continuous and linear manner; a sustain period C2b in which the flow is held at a constant level; and a following change period C2c in which the flow is increased in a continuous and linear manner. As illustrated, the degree of opening in the flow control valve 71 is started to be increased before the transition from the cycle C1 to the cycle C2, i.e., simultaneously with the start of the following change period C1c in the cycle C1, and the degree of opening is continuously and gradually increased until the end of the preceding change period C2a in the cycle C2. According to such a control as the above where the offgas flow is continuously changed over time in association with a change in the cycle time enables to avoid abrupt variations in the offgas flow supply to the vaporizer 1, differing from the conventional case where the offgas flow is changed in a stepwise manner. Therefore, according to such an offgas flow controlling method as the above, there is no abrupt change in the state of combustion in the vaporizer 1 even when the load on the PSA separator 5 is changed in the course of production increase in hydrogen-enriched gas in the hydrogen manufacturing system X1, and as a result, there is a decreased influence on the operation of the hydrogen manufacturing system X1.

In the flow change example shown in FIG. 3, the length of the following change period C1c in the cycle C1 is a half of the cycle time CT2 (160 seconds) of the cycle C2 (CT2/2=80 seconds). Further, the length of the following change period C1c in the cycle C1 which is CT2/2 (80 seconds) is equal to the length of the preceding change period C2a in the cycle C2. Further, during these two consecutive periods C1c, C2a, the rate of change in the offgas flow from the buffer tank 6 is constant. In addition, the offgas flow from the buffer tank 6 to the vaporizer 1 at the end of the preceding change period C2a in the cycle C2 is equal to an average flow of offgas discharged from the adsorption tower in the cycle C2. In other words, an average flow of offgas from the adsorption tower (broken lines) and the offgas flow from the buffer tank 6 (solid lines) are equal to each other in the sustain period C2b. Such a relationship between the cycles C1 and C2 as described exists in all pairs of consecutive cycles shown in FIG. 2 where the cycle time is shortened successively in association with the load change in the PSA separator 5.

As understood from FIG. 3, in the following change period C1c of the cycle C1, the amount of offgas supply from the buffer tank 6 (solid lines) becomes greater than the amount of offgas discharge from the PSA separator 5 (broken lines) by the amount represented by the area of a triangle T1 which is defined by the broken lines and the solid line. However, in the preceding change period C2a of the cycle C2, the amount of offgas supply from the buffer tank 6 (solid lines) becomes smaller than the amount of offgas discharge from the PSA separator 5 (broken lines) by the amount represented by the area of a triangle T2 which is defined by the broken lines and the solid line. On the other hand, as has been described, the length of the following change period C1c of the cycle C1 and the length of the preceding change period C2a of the cycle C2 are equal to each other, and the flow change rate is constant during the consecutive periods C1c, C2a; therefore, the triangle T1 and the triangle T2 are congruent to each other, and their areas are identical with each other. Therefore, over the range from the following change period C1c of the cycle C1 to the preceding change period C2a of the cycle C2, the triangle T1 and the triangle T2 cancel each other, offsetting the disbalance in the amount of offgas and thus, the amount of offgas discharged from the adsorption tower of the PSA separator 5 and the amount of offgas supplied toward the vaporizer 1 become equal to each other. Further, as described above, since the offgas average flow from the adsorption tower is equal to the offgas flow from the buffer tank 6 in the sustain period C2b, the amount of offgas discharged from the adsorption tower and the amount of offgas supplied toward the vaporizer 1 in this period are equal to each other. As understood from the above, a material balance is achieved in terms of the amount of offgas which flows into the buffer tank 6 and the amount of offgas which flows out of the buffer tank 6 before and after the load change in the PSA separator 5.

Figure 4:
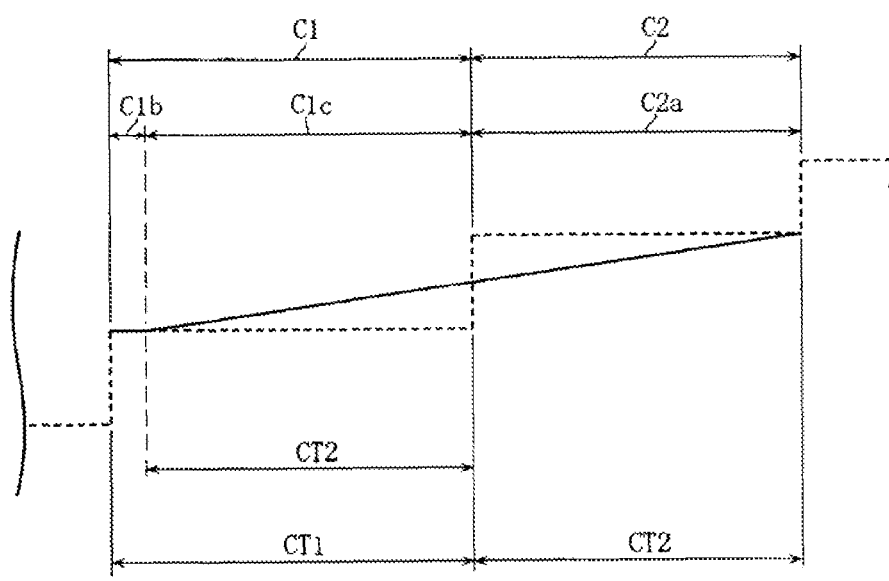
FIG. 4 is a diagram for describing a flow change example shown in FIG. 3

As described above, the length of the following change period C1c of the cycle C1 is a half (CT2/2) of the length of the cycle time CT2 of the cycle C2. Now, this point will be discussed specifically, with a primary focus on the period of change in the offgas flow (the following change period C1c of the cycle C1 and the preceding change period C2a of the cycle C2). First, in view of avoiding abrupt variations in the offgas flow, the offgas flow change rate should preferably be as small as possible, and therefore, the period for making the continuous change in the offgas flow should be as long as possible. While focusing only on the cycles C1, C2 with a consideration that the cycle time CT2 of the cycle C2 is shorter than the cycle time CT1 of the cycle C1, and assuming that the above-described geometric relationship, i.e., that the length of the following change period C1c and the length of the preceding change period C2a are identical with each other and that the flow change rate is constant throughout these consecutive periods C1c, C2a, is established only during the period covering the cycles C1, C2, a maximum possible value for the preceding change period C2a of the cycle C2 is the cycle time CT2 (see FIG. 4). In this case, the length of the following change period C1c of the cycle C1 is equal to the length of the preceding change period C2a of the cycle C2, and therefore is equal to the cycle time CT2 of the cycle C2. However, in the flow change example in FIG. 3, the process of changing the load on the PSA separator 5 includes the above-described cycles C1, C2 as well as other cycles, and is executed in such a way that the cycle time is successively become shorter. For this reason, in order for the above-described geometric relationship to exist also in all of the pairs of consecutive cycles other than the cycle C1, C2, a maximum value possible for the length of the preceding change period C2a of the cycle C2 and the following change period C1c of the cycle C1 is approximately a half of the cycle time CT2. This means that in such a control as the above which is performed when the cycle time is successively shortened in association with a load change in the PSA separator 5, changes in the offgas flow from the buffer tank 6 is maintained as small as possible while a material balance is kept in the amount of the offgas inflow and outflow with respect to the buffer tank 6 in the process of changing the load. Therefore, the control is suitable in operating the hydrogen manufacturing system X1 smoothly.

In such a flow control as the above, a computer operating with an appropriate program can calculate the cycle time for each cycle and the average flow of offgas (a portion drawn in broken lines in FIG. 2) discharged from the adsorption tower in each of the cycles performed in the PSA separator 5 from the start to the end of the load change, once the change (from 50% to 100% in the present embodiment) to be made to the PSA separator 5 is determined. Then, once the calculation has been made for the average flow of offgas discharged from the adsorption tower in each cycle, the computer operating with an appropriate program can calculate the change in the offgas flow (portions drawn in solid lines in FIG. 2) supplied from the buffer tank 6 to the vaporizer 1. Upon determination on the change in the offgas flow from the buffer tank 6, control signals about this flow is transmitted to the offgas flow controlling unit 7, and the offgas flow controlling unit 7 (the controller 72 and the flow control valve 71) makes adjustments so that the offgas flow from the buffer tank 6 will change as shown in FIG. 2 over time.

Next, description will be made for a control when the amount of production of hydrogen-enriched gas as a final product gas is decreased from the amount in normal operation of the hydrogen manufacturing system X1. When decreasing the amount of production of the hydrogen-enriched gas, it is necessary to decrease the load on the reforming reactor 2 and the PSA gas separator 5. In this case, it is preferable that abrupt load variations on the reforming reactor 2 be avoided, and therefore, the amount of raw material mixture supplied to the vaporizer 1, i.e. to the reforming reactor 2, is decreased continuously over time. As the amount of raw material mixture supply to the reforming reactor 2 decreases continuously, the amount of reformed gas generated in the reforming reactor 2 also decreases. As a result, the flow of reformed gas supplied to the PSA separator 5 also decreases continuously, which requires changes in operational conditions of the PSA separator 5. As for the PSA separator 5, since the adsorbent in the adsorption tower has a substantially fixed capacity to hold unnecessary components, if the flow of reformed gas introduced into the adsorption tower is decreasing continuously, the cycle time must be increased accordingly to compensate for the decrease in the reformed gas flow. As the cycle time is increased accordingly, the amount (flow) of the offgas discharged from the PSA separator 5 decreases.

Figure 5:
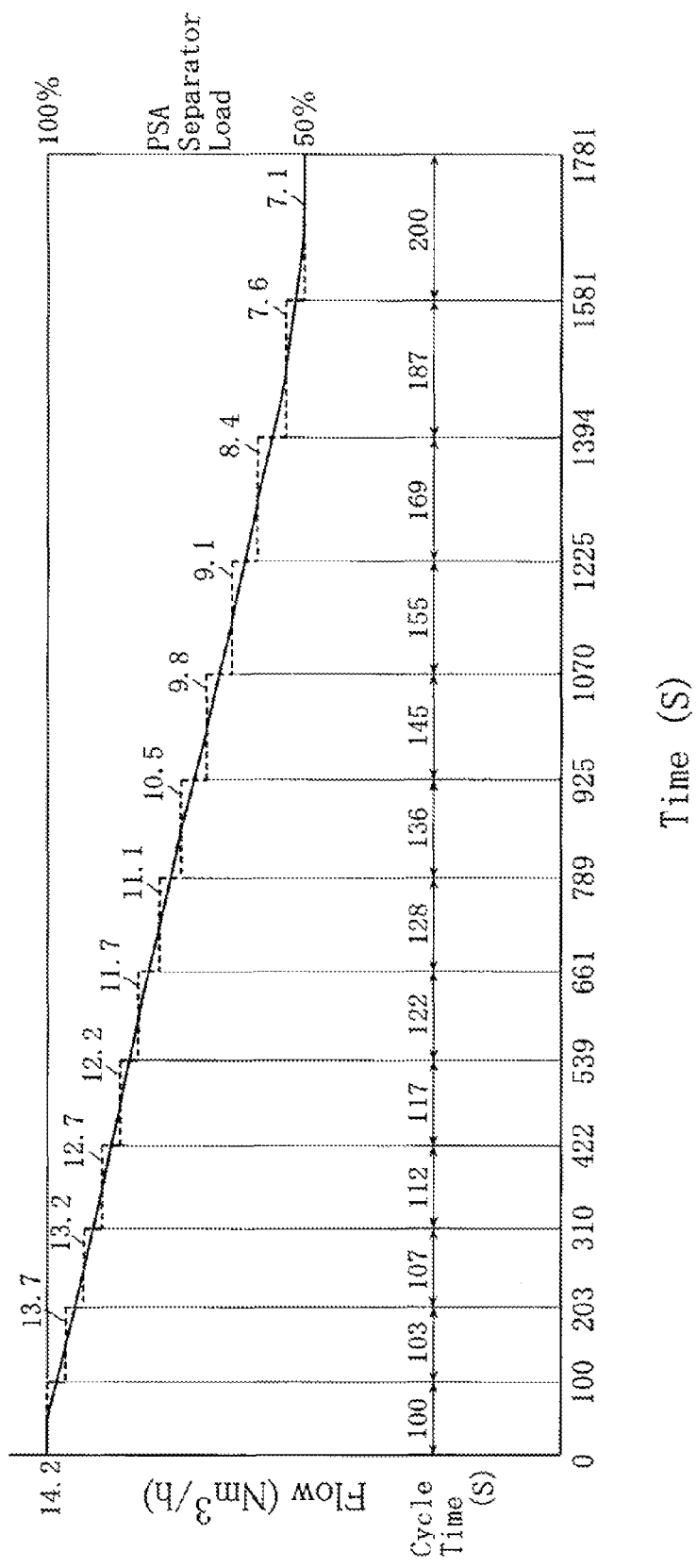
FIG. 5 is a graph for describing the offgas flow controlling method according to the present invention, showing an example of time-course changes in offgas supply flow from the buffer tank to the vaporizer in association with a decrease in the load on the pressure swing adsorption gas separator.
Figure 6:
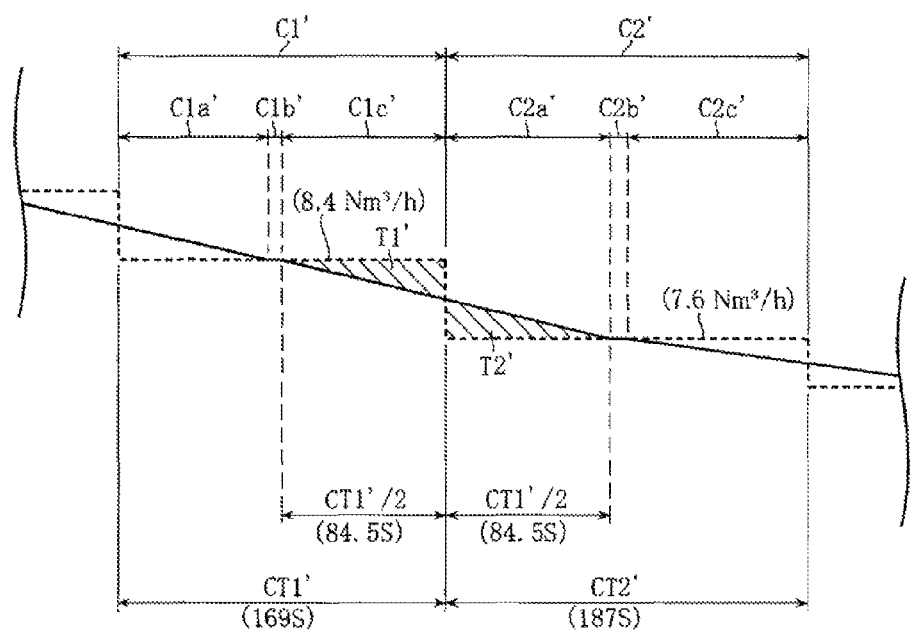
FIG. 6 is an enlarged portion of the graph shown in FIG. 5.

The control of the offgas which is supplied from the buffer tank 6 to the vaporizer 1 is performed so that the flow includes the portion continuously decreasing over time. FIG. 5 shows a graph as an example of time-course changes in the offgas flow from the buffer tank 6 to the vaporizer 1 under this control. FIG. 5 shows changes in the flow during the process in which the load on the PSA separator 5 is changed from 100% to 50%. In the graph in FIG. 5, the horizontal axis represents the time passed during the load change in the PSA separator 5 whereas the vertical axis (left side) represents the offgas flow. In the graph in FIG. 5, the broken lines represent an average flow of the offgas discharged from the adsorption tower in each cycle of the PSA separator 5 whereas the solid lines represent the offgas flow supplied from the buffer tank 6 to the vaporizer 1. It should be noted here that the broken lines in FIG. 5 (which indicate the above-mentioned average flow) correspond to changes in the offgas flow supplied from the buffer tank to the vaporizer in the conventional flow control method. FIG. 6 is an enlargement of a portion of FIG. 5, showing changes in the flow between two consecutive cycles C1', C2'.

In FIG. 6, as a changeover transition takes place from the cycle C1' to the cycle C2', the cycle time is increased from CT1' to CT2' for the new cycle. As shown in the figure, a change in the offgas flow (solid lines) from the buffer tank 6 includes a change portion in the cycle C1' as well as a change portion in the cycle C2'. Of these, the change portion in the cycle C1' is composed of a preceding change period C1a' in which the flow is decreased in a continuous, rectilinear manner; a sustain period C1b' in which the flow is held at a constant level; and a following change period C1c' in which the flow is decreased in a continuous and linear manner. Further, the change portion in the cycle C2' is composed of a preceding change period C2a' in which the flow is decreased in a continuous and linear manner; a sustain period C2b' in which the flow is held at a constant level; and a following change period C2c' in which the flow is decreased in a continuous and linear manner. As illustrated, the degree of opening in the flow control valve 71 is started to be decreased before the transition from the cycle C1' to the cycle C2', i.e., simultaneously with the start of the following change period C1c' in the cycle C1', and the degree of opening is continuously and gradually decreased until the end of the preceding change period C2a' in the cycle C2'. According to such a control as the above where the offgas flow is continuously changed over time in association with a change in the cycle time enables to avoid abrupt variations in the offgas flow supply to the vaporizer 1, differing from the conventional case where the offgas flow is changed in a stepwise manner. Therefore, according to such an offgas flow controlling method as the above, there is no abrupt change in the state of combustion in the vaporizer 1 even when the load on the PSA separator 5 is changed in the course of production decrease in hydrogen-enriched gas in the hydrogen manufacturing system X1, and as a result, there is a decreased influence on the operation of the hydrogen manufacturing system X1.

In FIG. 6, the length of the preceding change period C2a' in the cycle C2' is a half of the cycle time CT1' (169 seconds) of the cycle C1' (CT1'/2=84.5 seconds). Further, the length of the following change period C1c' in the cycle C1' is equal to the length (CT1'/2) of the preceding change period C2a' in the cycle C2'. Further, during these two consecutive periods C1c', C2a', the rate of change in the offgas flow from the buffer tank 6 is constant. In addition, the offgas flow from the buffer tank 6 to the vaporizer 1 at the end of the preceding change period C2a' in the cycle C2' is equal to an average flow of offgas discharged from the adsorption tower in the cycle C2'. In other words, an average flow of offgas from the adsorption tower (broken lines) and the offgas flow from the buffer tank 6 (solid lines) are equal to each other in the sustain period C2b'. Such a relationship between the cycles C1' and C2' as described exists in all pairs of consecutive cycles shown in FIG. 5 where the cycle time is increased successively in association with the load change in the PSA separator 5.

As understood from FIG. 6, in the following change period C1c' of the cycle C1', the amount of offgas supply from the buffer tank 6 (solid lines) becomes smaller than the amount of offgas discharged from the PSA separator 5 (broken lines) by the amount represented by the area a triangle T1' which is defined by the broken lines and the solid line. However, in the preceding change period C2a' of the cycle C2', the amount of offgas supply from the buffer tank 6 (solid lines) becomes greater than the amount of offgas discharged from the PSA separator 5 (broken lines) by the amount represented by the area of a triangle T2' defined by the broken lines and the solid line. On the other hand, as has been described, the length of the following change period C1c' of the cycle C1' and the length of the preceding change period C2a' of the cycle C2' are equal to each other, and the flow change rate is constant during the consecutive periods C1c', C2a'; therefore, the triangle T1' and the triangle T2' are congruent to each other, and their areas are identical with each other. Therefore, over the range from the following change period C1c' of the cycle C1' to the preceding change period C2a' of the cycle C2', the triangle T1' and the triangle T2' cancel each other, offsetting the disbalance in the amount of offgas and thus, the amount of offgas discharge fro the adsorption tower of the PSA separator 5 and the amount of offgas supplied to toward the vaporizer 1 become equal to each other. Further, as described above, since the average offgas flow from the adsorption tower is equal to the offgas flow from the buffer tank 6 in the sustain period C2b', the amount of offgas discharged from the adsorption tower and the amount of offgas supplied toward the vaporizer 1 in this period are equal to each other during the period. As understood from the above, in the present example of flow amount change, a material balance is achieved in terms of the amount of offgas which flows into the buffer tank 6 and the amount of offgas which flows out of the buffer tank 6 before and after the load change in the PSA separator 5.

Figure 7:
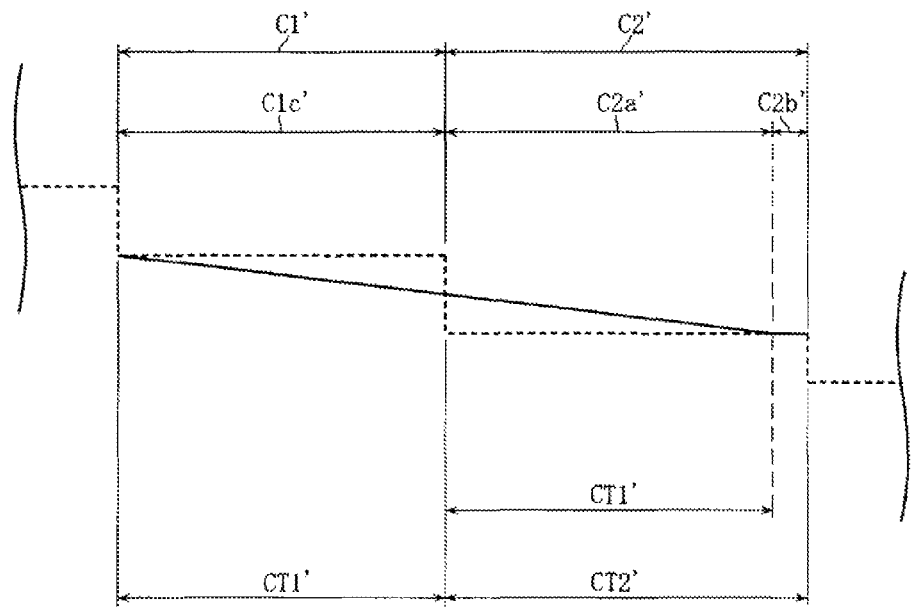
FIG. 7 is a diagram for describing a flow change example shown in FIG. 6.

As described above, the length of the preceding change period C2a' of the cycle C2' is a half (CT1'/2) of the length of the cycle time CT1' of the cycle C1'. Now, this point will be discussed specifically with a primary focus on the period of change in the offgas flow (the following change period C1c' or the cycle C1' and the preceding change period of C2a' of the cycle C2'). First, in view of avoiding abrupt variations in the offgas flow, the offgas flow change rate should preferably be as small as possible, and therefore, the period for making the continuous change in the offgas flow should be as long as possible. While focusing only on the cycles C1', C2' with a consideration that the cycle time CT2' of the cycle C2' is longer than the cycle time CT1' of the cycle C1', and assuming that the above-described geometric relationship, i.e., that the length of the following changeover period C1c' and the length of the preceding changeover period C2a' are identical with each other and that the flow change rate is constant throughout these consecutive periods C1c', C2a', is established only during the period covering the cycles C1', C2', a maximum possible value for the following change period C1c' of the cycle C1' is the cycle time CT1' (see FIG. 7). In this case, the length of the preceding change period C2a' of the cycle C2' is equal to the length of the following change period C1c' of the cycle C1', and therefore is equal to the cycle time CT1' of the cycle C1'. However, in the flow change example in FIG. 6, the process of changing the load on the PSA separator 5 includes the above-described cycles C1', C2' as well as other cycles, and is executed in such a way that the cycle time is successively increased. For this reason, in order for the above-described geometric relationship to exist also in all of the pairs of successive cycles other than the cycle C1', C2', a maximum value possible for the length of the following change period C1c' of the cycle C1' and the preceding change period C2a' of the cycle C2' is approximately a half of the cycle time CT1'. This means that in such a control as the above which is performed when the cycle time is successively increased in association with a load change in the PSA separator 5, changes in the offgas flow from the buffer tank 6 is maintained as small as possible while a material balance is kept in the amount of the offgas inflow and outflow with respect to the buffer tank 6. Therefore, the control is suitable in operating the hydrogen manufacturing system X1 smoothly.

Thus far, an embodiment of the present invention was described; however, the scope of the present invention is not limited to the embodiment given above. In the above embodiment, description was made for an offgas flow controlling method in cases where there is a load change in the PSA separator, using an example where the production of hydrogen-enriched gas is increased and another example where the production is decreased, from a state of normal operation. However, the offgas flow controlling method according to the present invention is also applicable to other cases where there is a load change in the PSA separator, such as an operation start time of the hydrogen manufacturing system (for a given amount of time from after the startup to the time when the state of normal operation is reached), or an operation stop time (for a given amount of time from the state of normal operation to the time when the operation has been stopped).

Specific arrangements in the hydrogen manufacturing system which is used to perform the offgas flow controlling method according to the present invention may be varied in many ways within the range of spirit of the invention. Also, application of the offgas flow controlling method according to the present invention is not limited to the hydrogen manufacturing system as described above, but the method may be applied to a system provided with an offgas consumption unit in which offgas from the PSA separator is consumed purposefully. For example, the present invention is applicable meaningfully to such a system where a row material gas containing methane and another gas component is introduced into a PSA separator for separation of said another gas component, yielding a methane-containing offgas, and the methane-containing offgas is then supplied as a fuel, via a buffer tank, to the offgas consumption unit.

The invention claimed is:

1. An offgas flow controlling method for a system, wherein the system includes:
 a pressure swing adsorption gas separator that executes pressure swing adsorption, the pressure swing adsorption gas separator being designed to repeat a cycle including an adsorption process and a desorption process, the adsorption process being performed for extracting first component gas as target gas from raw material gas, the desorption process being performed for extracting offgas from the raw material gas, the raw material gas containing, besides the first component gas, second component gas which is more easily adsorbable than the first component gas, the offgas containing the second component gas and the first component gas;
 an offgas consumption unit that consumes the offgas;
 an offgas supply pipe that supplies the offgas extracted from the pressure swing adsorption gas separator to the offgas consumption unit;
 a buffer tank provided at the offgas supply pipe that temporarily holds the offgas extracted from the pressure swing adsorption gas separator; and
 a flow control unit that controls a flow of the offgas supplied via the buffer tank to the offgas consumption unit;
 the method comprising a step of using the flow control unit to change the flow of the offgas supplied from the buffer tank to the offgas consumption unit in accordance with a load change in the pressure swing adsorption gas separator,
 wherein the change in the flow of the offgas takes place when a cycle time of the cycle including the adsorption process and the desorption process is changed,
 the flow of the offgas is changed continuously with time during at least part of a time of the change of the cycle time from a preceding cycle to a following cycle, and
 the pressure swing adsorption gas separator is operating continuously in the preceding cycle and the following cycle.

2. The offgas flow controlling method according to claim 1, wherein the preceding cycle includes a sustain period in which the flow of the offgas from the buffer tank is maintained at a constant level and a following change period in which the flow of the offgas is changed in a linear manner, wherein the following cycle includes a preceding change period in which the flow of the offgas from the buffer tank is changed in a linear manner and a sustain period in which the flow of the offgas is maintained at a constant level, wherein a length of the following change period in the preceding cycle is equal to a length of the preceding change period of the following cycle, and a change rate in the flow of the offgas from the buffer tank is constant throughout these two change periods, and wherein the flow of the offgas from the buffer tank at an end of the preceding change period in the following cycle is equal to an average flow of the offgas discharged from the adsorption tower in the following cycle.

3. The offgas flow controlling method according to claim 1, wherein the length of the following change period in the preceding cycle is a half of the cycle time of the following cycle in a case where the cycle time of the following cycle is decreased as compared to the cycle time of the preceding cycle.

4. The offgas flow controlling method according to claim 1, wherein the length of the preceding change period in the following cycle is a half of the cycle time of the preceding cycle in a case where the cycle time of the following cycle is increased as compared to the cycle time of the preceding cycle.

* * * * *